Aug. 2, 1966  F. A. BRIGNOLE, JR  3,263,793
PLATEN INDEXING MECHANISM
Filed Feb. 25, 1964  6 Sheets-Sheet 1

Fig-1

INVENTOR
FREDERICK A. BRIGNOLE, JR.
BY Thomas L. Ross
James R. Black Jr.
ATTORNEYS Aug. 2, 1966   F. A. BRIGNOLE, JR   3,263,793
PLATEN INDEXING MECHANISM
Filed Feb. 25, 1964   6 Sheets-Sheet 3

INVENTOR
FREDERICK A. BRIGNOLE, JR.

BY Thomas L. Ross
James L. Black Jr.

ATTORNEYS

United States Patent Office 3,263,793
Patented August 2, 1966

3,263,793
PLATEN INDEXING MECHANISM
Frederick A. Brignole, Jr., Granby, Conn., assignor, by mesne assignments, to Royal Typewriter Company, Inc., New York, N.Y., a corporation of Delaware
Filed Feb. 25, 1964, Ser. No. 347,162
5 Claims. (Cl. 197—120)

This invention relates to a platen indexing mechanism for an electric typewriter and more particularly to such a mechanism that is effective to impart paper feeding rotation to the typewriter platen before and after carriage return without noise and without carriage movement during repeat indexing after carriage return.

Most modern electric typewriters are equipped with power operated mechanism for indexing the platen and returning the carriage in response to depression of a key on the keyboard. As it is frequently desirable to repeat index, the mechanism will respond to manipulation of the carriage return key to index any number of lines desired. In this area current electric typewriters have certain shortcomings. A principal one is occurrence of carriage movement during repeat line spacing at the left-hand margin after carriage return, causing objectionable noise, vibration and occasionally damage to the carriage return mechanism. Such mechanism is exemplified in the Sanger Patent 2,647,609. Another shortcoming lies in occasional failure of the line lock mechanism to function at the termination of printing, i.e. at the right hand margin, occasioning overprinting.

It is accordingly among the objects of this invention to provide an integrated carriage return and platen indexing mechanism that overcomes the above-mentioned difficulties. Another object is to provide such a mechanism that is structurally simple and inexpensive, that may be easily assembled and adjusted and that is capable of extended use without repair or adjustment. Other objects will be in part apparent and in part pointed out hereinafter.

In the drawing wherein I have shown a preferred embodiment of the invention and wherein similar reference characters refer to similar parts throughout the several views.

In accordance with my invention, I provide a carriage return drawband, one end of which is attached in the usual manner to a spring-loaded, clutch controlled reel, the other end of the drawband being connected to the indexing side of the carriage opposite to the reel side thereof. The reel is mounted on a constantly rotating shaft to which it is attached when a clutch is engaged by manipulation of the carriage return key, the reel being spring biased to maintain tension on the drawband. The drawband is trained around a number of pulleys, one of which is mounted on a spring loaded indexing lever pivoted on the carriage frame. The lever is linked by a spring to an indexing pawl adapted upon operation to engage a ratchet secured to the platen to index the platen one or more line spaces. Thus, upon clutch engagement, the reel is rotated to pull on the drawband which in turn pivots the indexing lever, causing the pawl to engage and rotate the platen ratchet and accordingly index the platen. At the completion of indexing movement of the indexing lever, the clutch is still engaged, hence the drawband returns the carriage to the left hand margin where it is locked and the clutch is disengaged. Repeat indexing is effected by further manipulation of the carriage return lever.

As indicated above, prior machines equipped with mechanisms of this nature, were incapable of repeat indexing without a small amount of space return movement of the carriage with a subsequent falling back movement thereof into proper position under control of the escapement (see the Sanger patent referred to above). In this connection and further in accordance with my invention, the carriage includes two side frames in which a margin bar equipped with the usual right and left hand line-end stops, is mounted for limited axial movement, being spring biased to the left, as viewed from the front of the machine, against an adjustable stop mounted in the left side frame. The left hand end of this bar extends through its side frame and is formed to provide a cam surface. A bracket having a cam arm is pivotally mounted on a pin extending outwardly from the left side frame and this cam arm is adapted to engage the cam surface on the margin bar end when the bracket is pivoted. The bracket also includes a foot on which a by-pass lever is pivotably mounted. This lever underlies a finger comprising an integral part of the indexing lever which engages the bracket foot when the indexing lever is pivoted thus to rock the bracket and causes its cam arm to engage the margin bar cam end to move the bar axially to the right. This axial movement of the bar occurs prior to the completion of the indexing cycle which marks the initiation of the carriage return cycle. However, there still being tension on the drawband, it further rocks the indexing lever by reason of a pin and slot connection between the lever and the indexing pawl, so that the lever rides past the by-pass lever on the bracket, thus releasing the bracket so that its cam arm disengages the cam end of the margin bar, permitting the bar to resume its normal position to the left under the bias of its spring. As the carriage travels in return direction, the left hand stop on the margin bar ultimately contacts a paddle lever pivotably mounted on a center post which disengages the clutch. Such disengagement accordingly restores the carriage return and indexing mechanism to its normal condition so that repeat indexing may be effected by depression of the carriage return key without, however, effecting any return carriage movement; in other words, repeat indexing manipulation of the carriage return key will engage the clutch to cause the drawband to rock the indexing lever, but by the time indexing has been completed, and before the drawband imparts any movement to the carriage, the floating margin bar will have been cammed to the right to disengage the clutch, i.e., the carriage return mechanism will have been disabled to the preclusion of objectionable noise and wear on parts.

By virtue of the floating margin bar biased to the left by its spring, as viewed from the front of the machine, the right hand margin stop, carried by the margin bar, will engage a line lock paddle carried by the center post to actuate the line lock. If the line lock does not lock out the keyboard, a succeeding key bar depression will be accommodated so that the carriage may space one more pitch without over printing of the last character before the line lock locks.

Platen indexing mechanism

Figure 1:
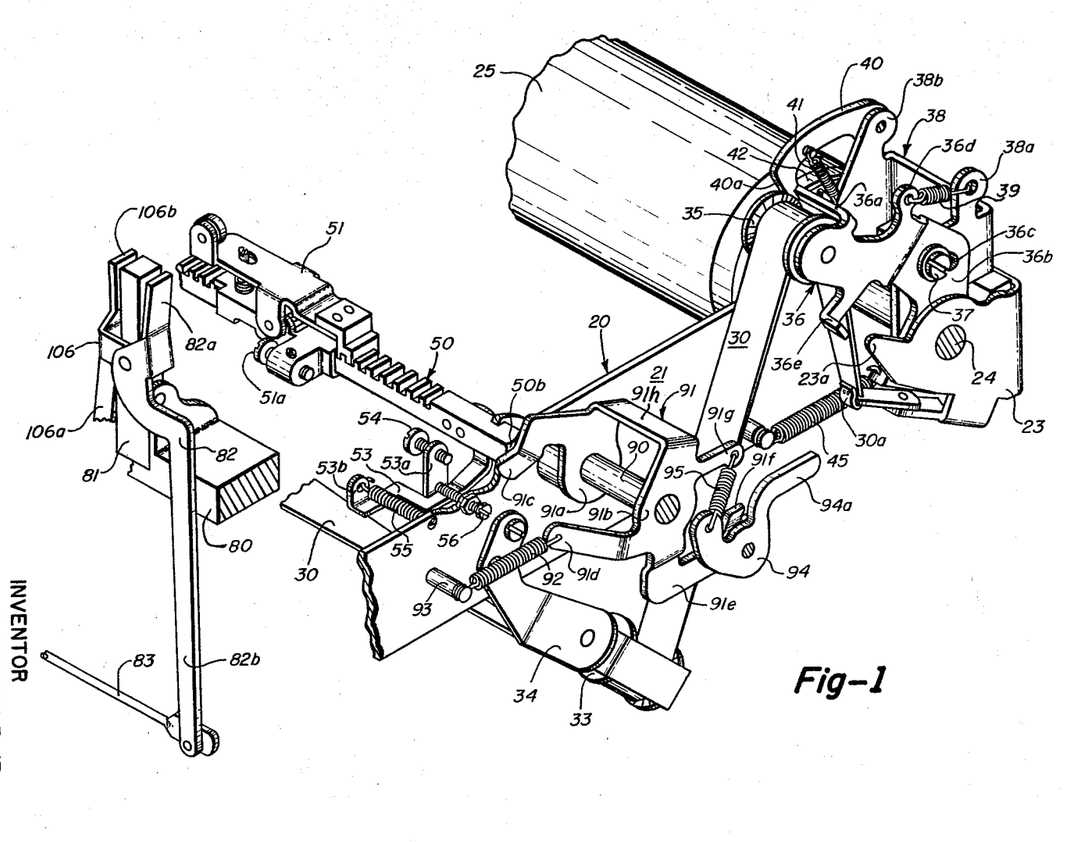
FIGURES 1 and 1A comprise a fragmentary isometric view from the rear of the left hand end of the typewriter carriage showing the platen indexing mechanism and incorporating various portions of the mechanism of the invention.
Figure 1A:
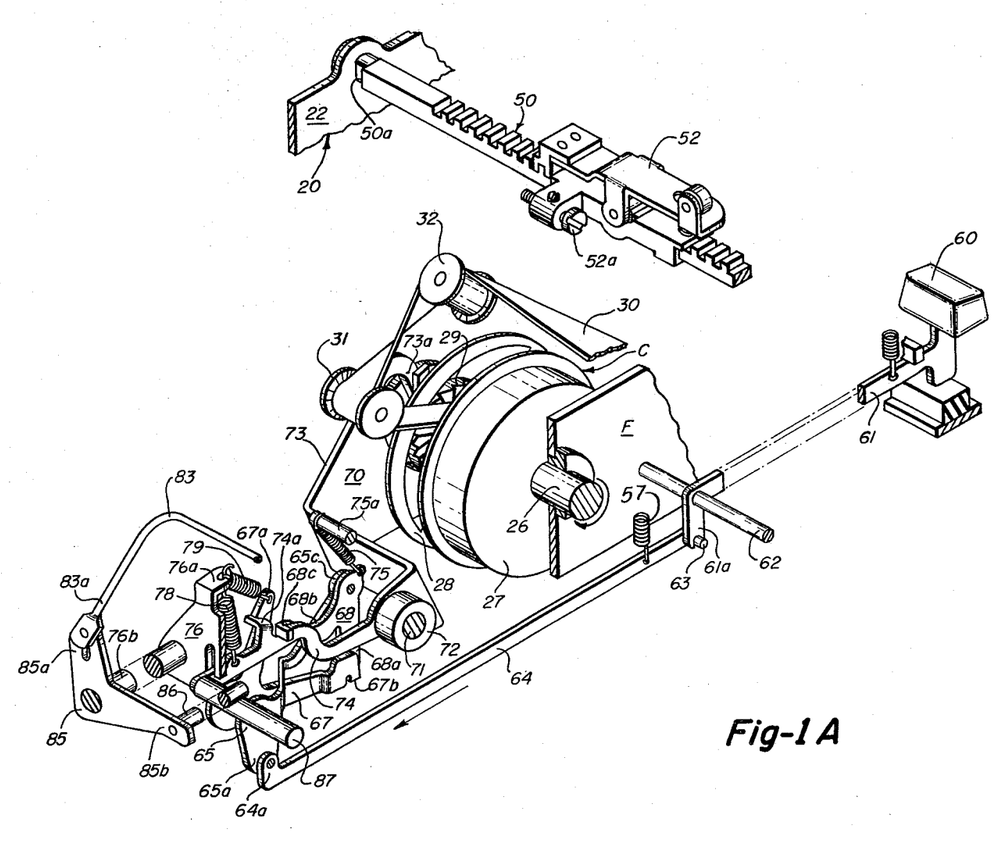

More particularly and with reference to FIGURES 1 and 1A a typewriter carriage is generally indicated at 20 and includes left and right side frames 21 and 22 as viewed from the front of the machine, bearing in mind that FIGURES 1 and 1A are views from the rear of the machine. A bracket 23 is secured to side frame 21 and rotatably supports one end of a shaft 24 which carries a platen 25, the other end (not shown) of shaft 24 being mounted in side frame 22. A constantly rotating shaft 26 is mounted in the machine frame F and extends through a spring housing 27 suitably secured to frame F. A drawband reel 28 is freely mounted on shaft 26 and includes a clutch element (not shown) adapted to be engaged by a cooperating clutch element 29 fastened to shaft 26 so as to rotate therewith, but being movable axially thereof so as to be engageable with the clutch element on reel 28. This clutch is generally indicated at C.

One end of a drawband 30 is fastened to the hub of reel 28, the reel having one end of a coiled spring (not shown) connected thereto, the other end of this spring being connected to spring housing 27, whereby the reel is biased clockwise (FIGURE 1A) to maintain tension on the drawband. The drawband is trained around pulleys 31 and 32 mounted on frame F, thence around a pulley 33 carried by a bracket 34 secured to carriage side frame 21 and finally around a pulley 35 mounted on an indexing lever generally indicated at 36 pivotally mounted on platen shaft 24. The end 30a of the drawband is secured to bracket 23. Thus when clutch C is engaged, reel 28 is driven to wind drawband 30 thereon, which results in return movement of carriage 20, all as will be described in greater detail below.

Indexing lever 36 includes a transverse arm 36a which overlies pulley 35 and serves to maintain drawband 30 thereon. Lever 36 also includes a side plate 36b by which the lever is mounted on shaft 24. A slot 36c is formed in lever plate 36b and receives a screw 37 which is threaded into a pawl bracket generally indicated at 38. A link spring 39 interconnects ears 36d and 38a comprising integral portions of lever 36 and bracket 38 respectively and serves to transmit motion to the bracket when the lever is rocked in a manner to be described. The left hand end of lever slot 36c normally bottoms against screw 37.

Figure 2:
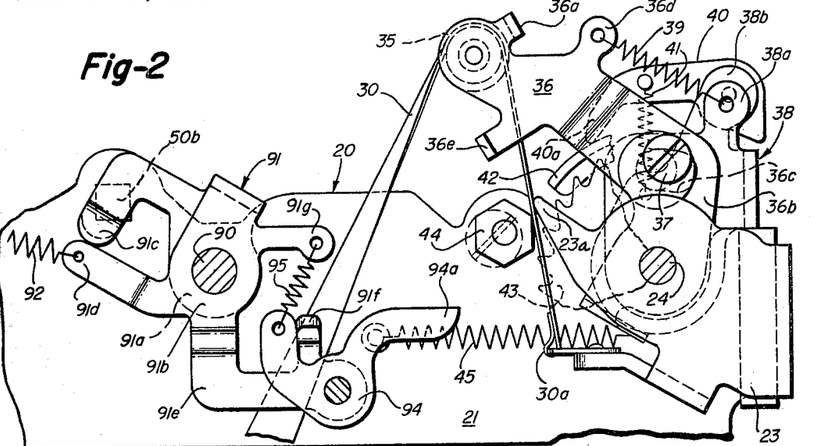
FIGURE 2 is a left side elevation showing the indexing mechanism in rest position.
Figure 3:
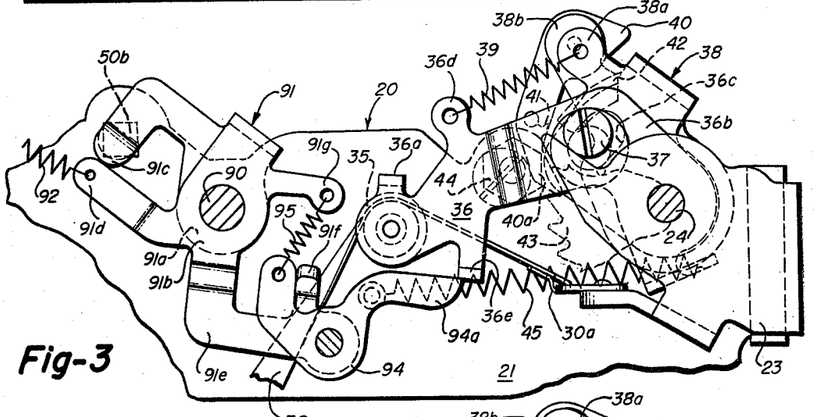
FIGURE 3 is an elevation similar to FIGURE 2 showing the mechanism in an active condition, wherein the platen is indexed.

Bracket 38 includes an upstanding ear 38b which pivotally supports a pawl 40 biased counterclockwise by a spring 41 interconnecting the pawl and bracket (see also FIGURES 2 and 3). The end 40a of pawl 40 normally rests on a ratchet shield 42 which is angularly adjustable around shaft 24, so that the amount of desired line spacing is selectively predeterminable. When the pawl end 40a rides off the left hand end of shield 42 during indexing movement of lever 36, it engages a ratchet 43 fastened to platen shaft 24 and rotates the ratchet and platen by an amount determined by the setting of shield 42, e.g. one, two or three line spaces. The limit of indexing movement of pawl 40 and accordingly platen 25 is determined by the adjustment of an eccentric screw 44 (FIGURE 2) threaded into side frame 21 where it lies in the path of movement of the pawl and comprises an adjustable stop therefore.

Initial indexing operation

From the foregoing it will now appear that when clutch C is engaged, drawband 30 is wound on reel 28. This causes counterclockwise rotation of indexing lever 36 against the bias of a return spring 45 and spring 39 pulls bracket 38 in the same direction causing pawl 40 to drive ratchet 43 thus to index the platen. The limit of indexing movement of pawl 40 is coincident with engagement of screw 37 (FIGURE 1) with an arm 23a comprising an integral portion of bracket 23. In this position, screw 37 will have bottomed against the left hand end of slot 36c so that continued movement of drawband 30 will continue movement of lever 36 until screw 37 bottoms against the right side of slot 36c at which time carriage return commences.

Carriage return mechanism

The carriage side frames 21 and 22 (FIGURES 1 and 1A) carry an axially movable margin bar generally indicated at 50. This bar carries adjustable left and right margin stops 51 and 52 of conventional nature which are respectively provided with adjustable stop screws 51a and 52a. Also secured to bar 50 is a bracket 53 having a finger 53a and an ear 53b, an adjustable final stop screw 54 being threaded into the finger to cooperate with carriage return paddle 82a as will be hereinafter more fully described and the ear 53b having one end of a spring 55 connected thereto, the other end of the spring being connected to side frame 21. The spring 55 accordingly biases bar 50 to the right (FIGURE 1) (to the left as viewed from the front of the machine) its limit of movement in this direction being determined by the setting of a stop screw 56 threaded through side frame 21. The limit of movement of bar 50 (one pitch) to the left against the pull of return spring 55 (FIGURE 1) is determined by a shoulder 50a on the bar abutting side frame 22 (see also FIGURE 1A). This capability of bar 50 to move axially is provided for a purpose that will be described below.

As shown in FIGURE 1A a carriage return key 60 is mounted on a key bar 61 pivotally supported by a shaft 62 extending horizontally from frame F. The key bar includes an arm 61a provided with a bifurcated end that receives a pin 63 fastened to one end of a link 64 biased upwardly by a spring 57. The rear end 64a (FIGURE 5) of link 64 is pivotally attached to one arm 65a of a latch lever trip crank 65 pivotally mounted on a pin 66 secured to frame F. Crank 65 also includes a trip arm 65b. Also pivotally mounted on pin 66 is a latch lever 67 comprising a latch 67a and trip arm 67b. Crank 65 includes a shoulder 65c which pivotally carries a lever 68 comprising a leg 68a and an arm 68b having a bent over finger 68c (FIGURE 1A) at its end.

A clutch actuator, generally indicated at 70, has a pin 71 which extends into a bushing 72 mounted in frame F whereby the actuator is pivotally supported by the frame. As is more clearly shown in FIGURE 5, actuator 70 includes a fork 73, provided with clutch operating prongs 73a and 73b, and an operating arm 74 having a bent over ear 74a adapted to normally underlie latch 67a. The top of arm 74 underlies and is engaged by lever finger 68c which is urged against the arm 74 by a spring 75 which interconnects lever 68 and a pin 75a fastened to frame F. A bracket 76 is fastened to frame F by a screw 77 and includes a bent over flange 76a which provides an anchor for the upper ends of a clutch actuator spring 78 and a latch spring 79, the lower ends of these springs being respectively connected to actuator arm 74 and latch 67a. Thus spring 78 urges actuator 70 counterclockwise and spring 79 urges latch 67a clockwise so that it normally overlies ear 74a.

Figure 5:
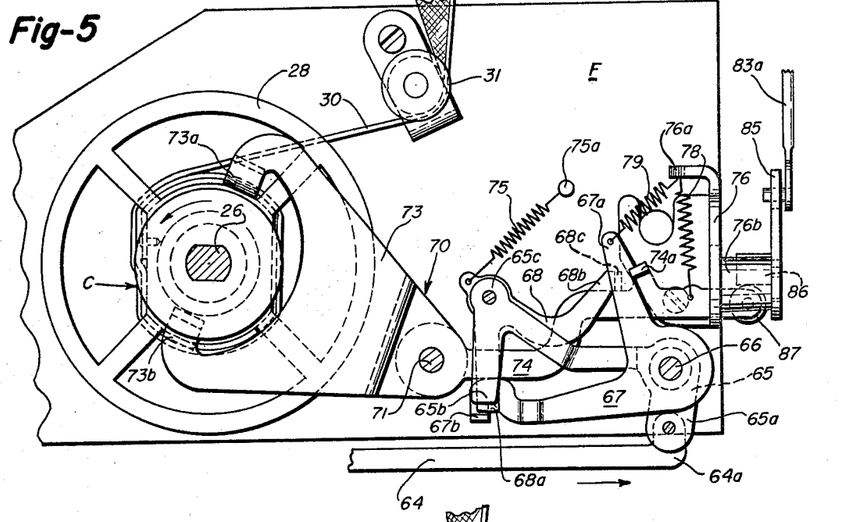
FIGURE 5 is a fragmentary side elevation showing the carriage return mechanism in clutch disengaging condition.

It may now be seen that when carriage return key 60 is depressed, link 64 (FIGURE 5) is moved to the right thus to rock crank 65 counterclockwise from the FIGURE 5 position. As the crank so rocks, lever leg 68a is carried downwardly so that its foot forces trip arm 67b downwardly to rock crank 67 counterclockwise thus disengaging latch 67a from actuator ear 74a. This permits spring 78 to rock actuator 70 counterclockwise, causing its prong 73a to axially move clutch element 29 into engagement with clutch element on reel 28, thereby winding return band 30 on reel 28 first to index the platen and then to return the carriage as described above. When actuator 70 is rocked clockwise its prong 73b disengages clutch C, as will be described below.

Carriage return knock-off

Figure 7:
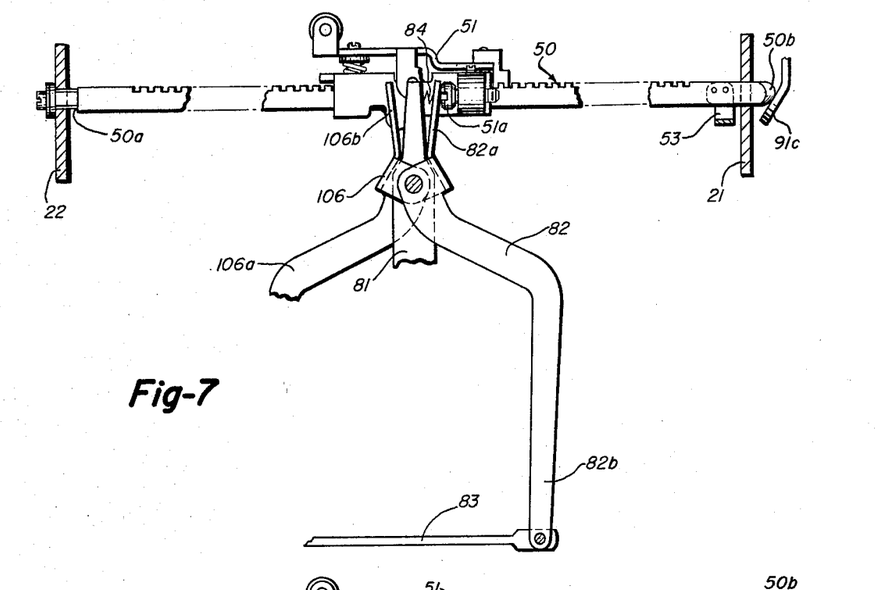
FIGURES 7 and 8 show the clutch knock-off lever and margin bar in normal and active conditions respectively.

With reference to FIGURES 1 and 1A, a support 80, secured to the machine frame, pivotally supports a centerpost 81 on which a carriage return knock-off lever 82 is pivotally mounted. This lever comprises an upwardly extending relatively short paddle 82a that is positioned in the path of movement of lefthand margin stop screw 51a and a relatively long downwardly extending arm 82b to the lower end of which is pivotally attached a link 83. A spring 84 (FIGURE 7) is disposed between center post 81 and paddle 82a thus to impart a clockwise bias to lever 82.

Figure 6:
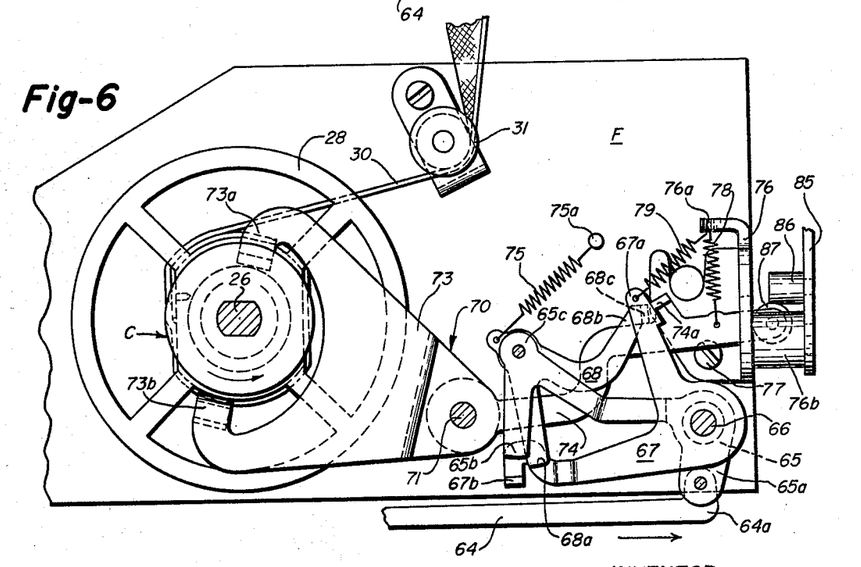
FIGURE 6 is similar to FIGURE 5 but shows the mechanism in clutch engaging condition.
Figure 8:
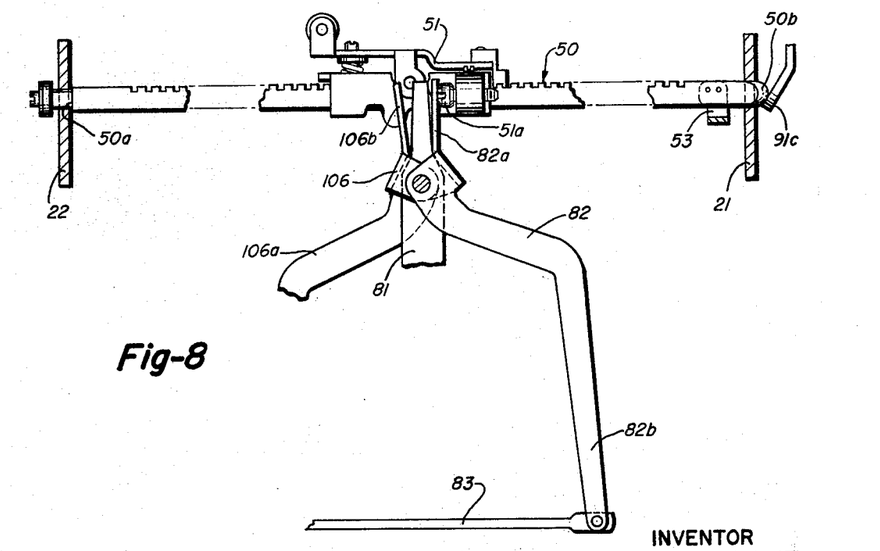

Referring back to FIGURE 1A, bracket 76 includes a pin 76b which pivotally supports a crank 85, one arm 85a of which is connected to the lefthand end 83a of link 83. The other arm 85b of this crank carries a pin 86 which overlies and is adapted to engage a rod 87 fastened to actuator arm 74. Thus at the end of return movement of the carriage, stop screw 51a (FIGURE 8) engages paddle 82a and rocks lever 82 counterclockwise against the pressure of spring 84 thus drawing link 83 to the right. This link movement rocks crank 85 (FIGURE 1A) so that its pin 86 forces actuator arm rod 87 and accordingly arm 74 downwardly against the pull of actuator drive spring 78 until ear 74a is latched by latch 67a. During this movement clutch actuator 70 is rocked clockwise from the FIGURE 6 to the FIGURE 5 position, thus causing its prong 73b to axially move clutch element 29 out of engagement with clutch element on reel 28. In this manner the carriage return mechanism is knocked out and the carriage return cycle completed.

Silent repeat indexing mechanism

In typewriters where the carriage return drawband is utilized for both platen indexing and carriage return, repeat indexing after carriage return, as indicated above, results in a small amount of carriage return movement which is noisy, creates undesired vibration, causes undesirable and uneconomical wear and occasionally results in damage requiring the attention of a serviceman. It is to the end of overcoming these disadvantages that the spring biased floating margin bar 50 and associated mechanism is provided as will now be described with reference first to FIGURE 1. A stud shaft 90 is secured to carriage side frame 21 and pivotally supports a cam bracket generally indicated at 91. The bracket comprises side plates 91a and 91b connected by a strap 91h and through which shaft 90 extends. A cam 91c extends from plate 91a and is so formed as to engage the cam follower end 50b of margin bar 50 when bracket 91 is rotated clockwise. An arm 91d extends from bracket plate 91b and serves to anchor one end of a spring 92, the other end of which is connected to a pin 93 secured to side frame 21, the spring exerting a clockwse bias on the bracket thus to maintain cam 91c in engagement with bar end 50b. Bracket 91 also includes an arm 91e having an outwardly bent finger 91f, the arm pivotally supporting a by-pass lever 94. This lever is biased clockwise against finger 91f, which acts as a stop, by a spring 95 interconnecting the by-pass lever and an arm 91g extending from bracket plate 91b. Lever 94 includes an arm 94a which underlies and is engageable by a foot 36e comprising as integral part of indexing lever 36.

Operation

Figure 4:
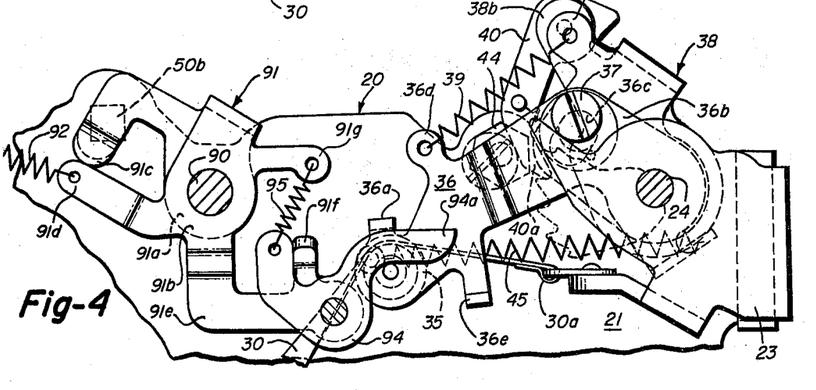
FIGURE 4 is an elevation showing the FIGURE 2 mechanism in another active condition, i.e. carriage return.

As described above, when the carriage return key 60 (FIGURE 1A) is depressed, the clutch C is engaged and drawband 30 is wound on reel 28 to rock indexing lever 36 (FIGURE 2) counterclockwise to its FIGURE 3 position. The lever pulls pawl 40 counterclockwise until its end slips off shield 42 into engagement with platen ratchet 43 which accordingly indexes the platen, as lever 36 continues its movement under the drive of drawband 30. Indexing ceases when pawl 40 engages eccentric 44. However, before indexing ceases, lever foot 36e engages by-pass lever arm 94a to start the clockwise rotation of cam bracket 91, which causes cam 91c to engage the cam follower end 50b of margin bar 50 to shift the bar to the left, as viewed in FIGURE 1, against the pull of its return spring 55. At this point bracket 38 is locked against further counterclockwise movement because pawl 40 is lodged against screw 44. Accordingly, continuing tension of drawband 30 causes further counterclockwise movement of indexing lever 36, which is accommodated by the screw and slot connection 37–36c between bracket 38 and lever 36, until screw 37 bottoms against the right hand end (FIGURE 4) of the slot which limits the travel of lever 36. With the parts in this position, lever foot 36e has ridden off the end of and underlies by-pass lever arm 94a permitting spring 92 to return bracket 91 to its FIGURE 4 position where cam 91c has released the follower end 50b of margin bar 50, whose return spring 55 returns the bar to normal position. This marks the end of platen indexing and lever 36 may, upon disengagement of the clutch C, return to normal position by rocking by-pass lever 94 counterclockwise.

Clutch C, however, is still engaged, thus reel 28 is still rotating to wind drawband 30 thereon. Recalling that lever 36 has reached the limit of its counterclockwise movement, continued tension of the drawband imparts return movement of carriage 20 until stop screw 51a engages paddle 82a of knock-off lever 82 to rock this lever counterclockwise (FIGURE 1) thus to pull link 83 to the right. Such movement of link 83 pivots crank 85 (FIGURE 1A) clockwise lowering pin 86 against actuator rod 87 to overpower spring 78 and rock actuator 70 counterclockwise to disengage clutch C. This marks the end of the carriage return cycle with all of the parts returned to normal position and the platen indexed.

Frequently repeat indexing after carriage return is necessary. To this end carriage return key 60 is depressed to rock crank 85 (FIGURE 1A) clockwise, resulting in clockwise pivotable movement of clutch actuator 70 to engage clutch C, thus to wind drawband 30 on reel 28. Indexing lever 36 (FIGURE 1) is accordingly rocked counterclockwise as described above to index platen 25. When lever foot 36e engages by-pass arm 94a, bracket 91 is rotated clockwise so that cam 91c engages follower end 50b of margin bar 50 forcing the bar to the left (FIGURE 1) against the pull of return spring 55 and as the indexing movement of lever 36 continues, the margin bar is cammed sufficiently to cause its stop screw 51a to rock knock-off lever 82 counterclockwise a sufficient amount to effect disengagement of clutch C, as described above, and accordingly take the tension from drawband 30. This precludes any return movement of carriage 20. It should be noted that platen indexing is completed or substantially so at the knock-off portion of the repeat indexing cycle, momentum of the indexing elements of the mechanism assuring completion of the repeat indexing cycle just prior to or at the initiation of carriage return knock-off. In this manner noiseless and vibration-free repeat indexing is effected, without resort to separate mechanism, and without return movement of the carriage.

Line lock

A type bar electric typewriter will occasionally, when operated by a highly skilled and fast typist or by an erratic typist, overprint at the end of the line because the carriage has reached the right hand margin stop and can go no further in letter spacing direction. Most machines of this nature are equipped with a line lock mechanism which is provided to prevent such overstriking but which sometimes fails where the typist is very fast or erratic. The reason for this is that the line lock responds to carriage letter spacing whose cycle of operation is of longer duration than that of a type bar. Hence it is quite possible for two type bars to be in flight at line end and an overstrike is, accordingly, inevitable. Through the provision of my floating margin bar 50 and the line lock mechanism associated therewith such overstriking is obviated as will now be described.

Figure 9:
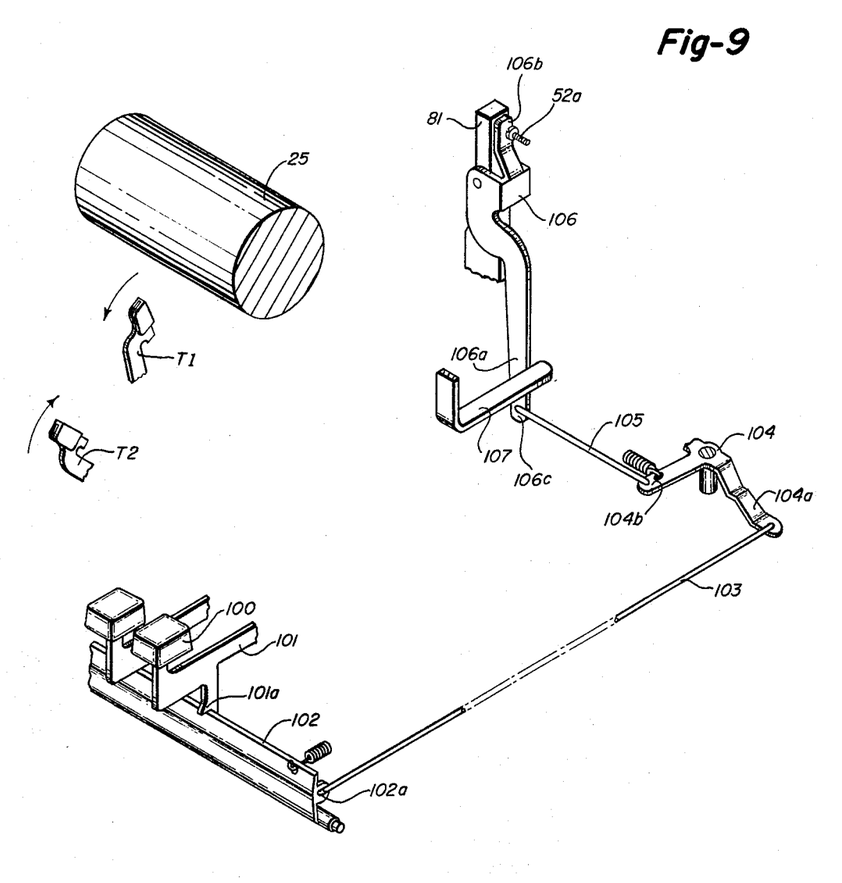
FIGURE 9 shows the line lock mechanism.

As shown in FIGURE 9, a conventional alpha-numerical key 100 is carried by a key bar 101 pivotally mounted on the machine frame, the key bar including a lug 101a which is positioned to coact with a transverse bail 102 comprising a portion of the line lock mechanism. It will be understood that key bar 101 is typical of the plurality of key bars in a conventional typewriter keyboard. The ends of bail 102 are pivotably carried by the machine frame, the bail being provided with a slotted lug 102a to which is connected one end of a link 103. The rear end of this link is pivotally connected to one arm 104a of a bell crank 104 pivotably mounted on the machine frame, the other arm 104b of the crank having pivotably secured thereto one end of a link 105. The other end of link 105 is pivotably secured to the arm 106a of a lever 106 pivotably mounted on center post 81. Lever 106 includes a paddle 106b positioned to lie in the path of travel of right hand margin stop screw 52a on right hand margin stop 52 (see also FIGURE 1A) adjustably mounted on the floating margin bar 50. Lever 106 also includes a tail 106c which is engageable with an escapement controlling arm 107, when lever 106 is rocked counterclockwise as viewed in FIGURE 9 to block the escapement mechanism (not shown), thus to preclude further character spacing. In FIGURE 9 there are also illustratively shown a pair of type bars T1 and T2, both in flight, the former retreating from the printing position at platen 25 and the latter advancing thereto. Bearing in mind that the character spacing cycle of operation exceeds that of a type bar cycle of operation, e.g. a character spacing cycle of 50 milliseconds, as against a type bar cycle of 35 milliseconds, it may be seen that a second type bar cycle may be initiated at line end before completion of the preceding type bar cycle and before initiation of a letter spacing cycle, the completion of which under control of the escapement mechanism, determines setting of the line lock. In other words, the escapement mechanism will not release the carriage for character spacing until a character has been printed. It follows that if the line lock is not set when the character is at line end, the right hand margin is printed and the carriage is locked by the escapement an overprint will occur. By the provision of floating margin bar 50 and its stop shoulder 50a such over-printing is precluded. When stop screw 52a (FIGURE 1A) engages line lock paddle 106b at line end the line lock mechanism described is activated. However, as pointed out above, the line lock may not respond with sufficient rapidity to preclude initiation of another type bar cycle; but because margin bar 50 may float one pitch to the left as viewed in FIGURE 1A, as determined by the space between its shoulder 50a and carriage side frame 22, the carriage is permitted to letter space one pitch thus precluding an over strike. By this time the line lock mechanism will have been actuated to preclude depression of another alpha-numerical key bar.

It may now be seen that I have provided a typewriter indexing and carriage return mechanism that attains the several objects set forth above in a thoroughly practical and efficient manner.

As other embodiments of the invention are possible and as modifications of the one disclosed may be made, all without departing from the scope of the invention it is to be understood that the foregoing should be interpreted as illustrative and not in a limiting sense.

I claim:
1. In an electric typewriter having a rotatable platen including a platen shaft, a constantly rotating power shaft and a traversable carriage having side frames on which the platen shaft is mounted, the combination of,
    an indexing ratchet connected to said platen,
        rockable pawl means mounted on said platen shaft and engageable with said ratchet to index said platen,
        stop means to limit indexing movement of said pawl means,
        an indexing lever rockably mounted on said platen shaft,
        resilient driving means interconnecting said pawl means and said indexing lever whereby said indexing lever is operable to drive said pawl means and is also movable relative thereto when said pawl means has reached the limit of its indexing movement,
    a drawband reel freely mounted on said power shaft,
    a clutch associated with said reel and said power shaft,
    a drawband having one end connected to said reel and frictionally coupled with said indexing lever whereby upon engagement of said clutch said drawband is wound on said reel first, to rock said indexing lever to index the platen until said pawl means reaches the limit of its indexing movement and thereafter to impart return movement to said carriage,
    a margin bar resiliently mounted on said carriage side frames for limited longitudinal movement from and to a normal position relative to said carriage and having a left hand margin stop adjustably mounted thereon,
    a cam member rotatably mounted on one of said side frames and engageable with said margin bar, said cam member including a by-pass arm engageable by said indexing lever upon indexing movement thereof to rotate said cam member thereby to move said margin bar longitudinally in a carriage return direction relative to said carriage,
    and means operable by said left hand margin stop upon such longitudinal movement of said margin bar to disengage said clutch at the completion of platen indexing to thereby preclude return movement of said carriage during repeat indexing of said platen.

2. In an electric typewriter having a rotatable platen mounted on a shaft carried by end frames, a constantly motor driven shaft, a traversable platen carriage, a drawband reel freely mounted on said motor driven shaft, and a clutch associated with said motor driven shaft and said reel, in combination,
    manually operated means to engage said clutch,
    a drawband connected to said reel and windable thereon upon engagement of said clutch,
    indexing means on said carriage operatively associated with said platen and anchoring the end of said drawband and operable upon engagement of said clutch first to index said platen and then effect return movement of said carriage,
    a margin bar resiliently mounted on said carriage for limited longitudinal movement by said indexing means in a carriage return direction from a normal position relative to said carriage and returned to said normal position by said resilient mounting before said indexing means effects return movement of said carriage, said margin bar having a margin stop positioned thereon,
    and means operable by said margin stop to disengage said clutch whereby said limited longitudinal movement of said margin bar is operative to disengage said clutch and thereby preclude any carriage return movement only during repeat indexing when said carriage is in a carriage return position.

3. In a typewriter having a frame,
    a carriage movable relative to said frame,
    a platen rotatably mounted on said carriage,
    platen indexing means,
    a center post supported vertically on said frame,
    a margin bar resiliently mounted on said carriage for limited longitudinal movement from a normal position relative to said carriage and returned to said normal position by said resilient mounting and having a margin stop positioned thereon and operable to arrest carriage movement upon encountering said center post,
    a constantly rotating power shaft,
    clutch means engageable incident to the initiation of a carriage return movement to connect said power shaft to said carriage and to said platen indexing means whereby said platen is indexed prior to carriage return movement and said clutch is normally disengageable at the end of carriage return movement, disengaging means responsive to the contacting of said margin stop with said center post for disengaging said clutch means, and motion producing means operable by said platen indexing means to longitudinally move said margin bar from said normal position in a carriage return direction prior to each carriage return movement whereby only when said carriage is in a carriage return position and a seubsequent carriage return is initiated will said limited longitudinal movement of said margin bar disengage said clutch immediately following platen indexing thereby precluding any carriage movement.

4. Mechanism according to claim 3 wherein said motion producing means includes a cam mechanism operably engageable by said indexing means and rotatably mounted on said frame at one end of said margin bar for longitudinally moving said margin bar from its normal position with respect to said carriage whenever said cam mechanism is rotated from an initial position by said platen indexing means.

5. Mechanism according to claim 4 further comprising means connected to said indexing means for disengaging said cam mechanism from said platen indexing means wherever said carriage return is initiated from any carriage position other than said carriage return position, and resilient means fixed to said frame and to said cam mechanism for rotating said cam mechanism back to said initial position thereby permitting said resilient mounting to return said margin bar to said normal position.

References Cited by the Examiner

UNITED STATES PATENTS

| | | | |
|---|---|---|---|
| 1,931,383 | 10/1933 | Hart | 197—66 |
| 2,189,942 | 2/1940 | Eibert | 197—65 X |
| 2,262,676 | 11/1941 | Helmond | 197—120 X |
| 2,362,229 | 11/1944 | Yaeger | 197—65 X |
| 2,393,441 | 1/1946 | Yaeger | 197—108 X |
| 2,395,763 | 2/1946 | Sagner | 197—120 X |
| 2,567,937 | 9/1951 | Hart | 197—66 |
| 2,675,902 | 4/1954 | Kupper | 197—110 X |
| 2,729,322 | 1/1956 | Kloski | 197—66 |

ROBERT E. PULFREY, *Primary Examiner.*

DAVID KLEIN, *Examiner.*

ERNEST T. WRIGHT, *Assistant Examiner.*